May 26, 1936. J. E. McMAHON 2,041,774
JOURNAL BEARING PROTECTOR
Filed April 22, 1935
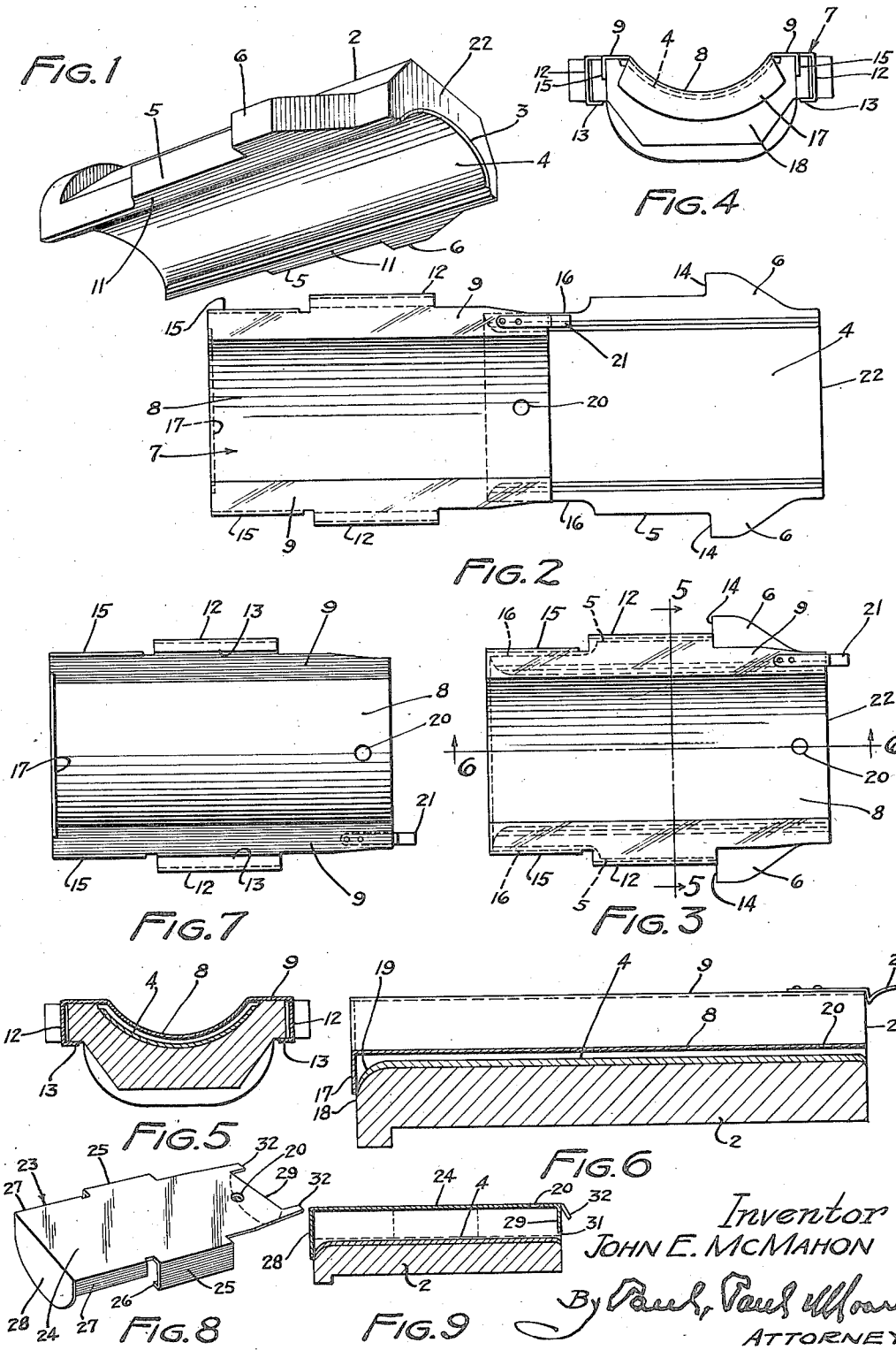
Inventor
JOHN E. McMAHON
By Paul, Paul & Moore
ATTORNEYS Patented May 26, 1936

2,041,774

UNITED STATES PATENT OFFICE 2,041,774

JOURNAL BEARING PROTECTOR

John E. McMahon, St. Paul, Minn.

Application April 22, 1935, Serial No. 17,688

9 Claims. (Cl. 308—53)

This invention relates to an improved device for protecting journal bearings when being shipped from one point to another, or when in storage, to prevent the finished bearing surfaces thereof from becoming marred or damaged, prior to installation of the bearings in the usual journal boxes.

Railroad companies have, in recent years, begun to realize the importance of accurately machined journal bearings. Journal bearings, such as are commonly used in the journal boxes of railroad cars and coaches, are interchangeably supported in the upper portion of the journal boxes, and each has a bearing surface engaging the journal of the wheel axle, and through these bearings the load is transmitted from the journal box to the journal. The lower portion of the journal is usually open to the interior of the journal box, and is engaged with a suitable packing which is saturated with a lubricant, thereby to lubricate the journal bearing. Because of the heavy load usually carried on a journal bearing, it is of utmost importance that the bearing surface thereof be accurately machined and refinished so as to provide substantially a flawless bearing surface. If a defect is present in the bearing surface of a journal bearing, it may cause rapid deterioration of the bearing surface as a result of "cutting", or an abrading action may develop which will quickly wear away the lining or Babbitt material of the bearing and result in what is commonly known as a "hot box". When a "hot box" develops, the bearing surface of the journal bearing is usually destroyed, and a new bearing must then be substituted for the damaged one, which obviously means temporary interruption of the train while such repairs are made.

To minimize train interruptions and delays, resulting from defective bearings, manufacturers of journal bearings are now using a Babbitt or alloy metal, which has sufficient hardness to permit accurate machining of the bearing surfaces, and whereby the bearing surfaces may be broached thereby to provide a smooth, and flawless bearing surface. Unless the finished bearing surface is protected while the bearing is being shipped from one place to another, or while in storage, the bearing surface is likely to become marred or scratched as a result of contacting with other objects, whereby it may be permanently damaged so that the journal bearing may be rendered unfit for use. In some cases, when a bearing which has thus been damaged or marred in transit, is installed in a journal box, it may quickly result in a "hot box", whereby it becomes necessary to interrupt the progress of the train to make repairs.

To avoid such damage to journal bearings, while in transit, extreme care must now be exercised in the handling thereof in order to avoid damaging their unprotected bearing surfaces. This obviously increases the cost of shipping them, as well as the cost of making repairs.

The novel bearing protector herein disclosed, was particularly designed to facilitate the handling of journal bearings while in transit. Briefly, the device comprises a body member adapted to be fitted over the bearing surface of the bearing, and having means for detachably securing it thereto, whereby when the journal bearing reaches its destination, the protector may be quickly removed therefrom and returned to the distributor for further use. The protector completely conceals the bearing surface and has sufficient strength and rigidity to positively prevent the bearing surface from becoming damaged, even though the journal bearing be roughly handled, while in transit, thereby assuring that each bearing will be delivered to the user in its original state of perfection.

An object of the present invention, therefore, is to provide an improved journal bearing protector, which may readily and quickly be attached to a conventional journal bearing to thereby conceal and protect the bearing surface thereof, and whereby the journal bearing may be shipped, together with other commodities, without danger of the bearing surface thereof becoming damaged.

Other objects of the invention reside in the simple and inexpensive construction of the protector, whereby it may be manufactured in quantity production at a very small cost; in the unique shape thereof, whereby it completely conceals the bearing surface of the bearing so that the latter cannot accidentally become damaged while in transit, even though roughly handled; and, in the novel means for detachably securing the protector to the bearing, whereby it may be quickly attached thereto or detached therefrom, and also whereby it may be used over and over again, and whereby the journal bearings may be shipped together with other rough commodities, with the result that the cost of shipping is greatly reduced.

Other objects of the invention will appear from the following description and accompanying drawing and will be pointed out in the annexed claims.

In the accompanying drawing there has been disclosed a structure designed to carry out the various objects of the invention, but it is to be understood that the invention is not confined to the exact features shown as various changes may be made within the scope of the claims which follow.

In the drawing:

Figure 1 is a perspective view of a journal bearing detached from the journal box;

Figure 2 is a bottom view of the journal bearing showing the novel protector about to be fitted thereto;

Figure 3 is a view similar to Figure 2, showing the protector in position on the journal bearing, and wherein it will be noted that the bearing surface is completely concealed;

Figure 4 is an end view of the bearing in inverted position, and showing the protector attached thereto;

Figure 5 is a cross-sectional view on the line 5—5 of Figure 3;

Figure 6 is a longitudinal sectional view on the line 6—6 of Figure 3;

Figure 7 is a top view of the protector, or in other words, a view looking at it from the opposite side of that shown in Figures 2 and 3;

Figure 8 is a view showing a protector of slightly modified construction, whose body is not curved to substantially fit the contour of the bearing surface, as in the other figures; and Figure 9 is a longitudinal sectional view of Figure 8.

In the selected embodiment of the invention here shown, for purposes of disclosure, there is illustrated in Figure 1, a journal bearing of ordinary construction, comprising the usual body 2 having its lower side concaved, as shown at 3 and provided with a bearing surface 4, composed of a suitable bearing metal as, for example, babbitt. The bearing surface 4 is shaped to fit the contour of the usual journal of the car or locomotive axle.

The journal bearing is supported in the upper portion of the usual journal box, not shown in the drawing, and is provided at its opposite sides with flanged portions 5 having projections or lugs 6 thereon adapted to engage means in the journal box, thereby to retain the journal bearing in proper position therein. The journal box and axle journal are of well-known construction, and it is therefore thought unnecessary to therein illustrate the same. The journal type of bearing shown in Figure 1 has now become generally standardized by most railroads, and as it is this particular part of the car journals which becomes worn, they are interchangeably supported in the journal boxes, and are shipped all over the country for repair purposes.

The outstanding feature of the present invention resides in the provision of means for protecting the bearing surfaces 4 of the journal bearings, when they are thus shipped from one point to another as, for example, from the manufacturer to a distributor, or to a storehouse at a railway terminal, whereby the bearing surfaces cannot accidentally become damaged while the bearings are in shipment.

The novel means herein shown for thus protecting the bearing surface of a journal bearing, comprises a protecting member, generally indicated by the numeral 7, and preferably having a concaved wall 8 terminating at its opposite sides in horizontal wall portions 9—9, adapted to be seated against the surfaces 11 of the journal bearing, as best shown in Figure 5. The horizontal wall portions 9 preferably extend the full length of the protecting member 7, as clearly illustrated in Figures 2, 3, and 7, and have right angled wall portions 12—12 integrally formed therewith. The wall portions 12—12 have inwardly turned marginal flanges 13 which cooperate with the wall portions 12—12 to embrace the oppositely disposed flanges 5 of the journal bearing, thereby to secure the protecting member thereto. The corresponding ends of the wall portions 12 abuttingly engage the adjacent faces 14 of the lugs 6, as shown in Figure 3, thereby to limit sliding movement of the protecting member in one direction upon the bearing.

To further strengthen the flanges 9—9 of the protecting member 7 at one end thereof, said flanges may be provided with downwardly bent flanges 15—15, as best shown in Figures 3 and 7, which fit over the outer sides or edges 16 of the journal bearing, as will be clearly understood by reference to Figures 2 and 3.

One end of the protecting member is shown provided with a reinforcing flange 17, integrally formed with the sheet metal from which the body of the member is made, and this flange 17 is adapted to substantially abuttingly engage the end 18 of the bearing, as best illustrated in Figure 6. The arcuately formed flange 17 also prevents foreign matter from contacting with the curved surface 19 of the bearing surface 4, as will readily be understood by reference to Figure 6.

The protecting member is preferably so shaped that it is held in position upon the journal bearing by friction, whereby when once it has been slid onto the bearing, it cannot readily become detached therefrom while the bearing is in transit. The frictional engagement of the protecting member with the journal bearing, however, is such that the protecting member may readily be detached from the journal bearing, when desired, so that when the bearing reaches its destination, or it is to be installed in a journal box, the protecting member may readily be detached, after which it is returned to the sender for further use.

In some instances, it may be desirable to provide added means for detachably securing the protecting member to the journal bearing. Such a means is illustrated in Figures 2, 3, 6, and 7, and may consist of a spring clip 21 suitably secured to the body of the protector, as, for example, to one of the horizontal wall portions 9 thereof. This clip may be arranged to engage the end 22 of the journal bearing, when the protecting member 7 is fitted thereto, as clearly illustrated in Figures 3 and 6.

An important feature of the protecting member herein disclosed resides in the fact that it completely seals the bearing surface 4, as will be understood by reference to Figures 3, 5, and 6. It is also to be noted by reference to Figures 5 and 6, that the curved wall 8 of the protecting member is spaced from the bearing surface 4, whereby said wall cannot accidentally damage the finished surface of the bearing, when the member 7 is being attached thereto or removed therefrom. Also, by concealing the bearing surface 4, as shown in Figure 6, the bearing surface cannot accidentally become damaged when the bearing is shipped from one place to another.

A suitable aperture 20 is preferably provided in the wall 8 adjacent one end of the protector whereby a plurality of protectors may be wired or tied together for shipment, as when they are returned to the distributor or sender for further use.

Figures 8 and 9 illustrate a protecting member 23, in which the main wall 24 thereof is not curved to correspond to the contour of the bearing surface 4, as in the other figures. In the form here shown, the wall 24 extends from side to side of the journal bearing and is provided with right angle wall portions 25—25, corresponding to the wall portions 12—12 of the protecting member 7. These wall portions 25 are provided with inturned flanges 26 which cooperate with the wall portions 25 to embrace the oppositely disposed flanges 5 of the journal bearing. The bearing protector 23 has flanges 27, similar to the flanges 15 of the protecting member 7.

The wall 24 is provided at its ends with downwardly bent wall portions 28 and 29, the wall 28 being adapted to engage the end of the bearing in a manner similar to the flange 17 in Figure 6. The wall 29 is shown relatively smaller than the wall 28, whereby the edge 31 thereof will clear the bearing surface 4, when attaching the protector to the journal bearing. Suitable lugs 32 are provided adjacent to the wall 29, and are adapted to be bent downwardly over the end of the bearing, thereby to secure the protecting member thereto. To remove the protecting member from the bearing, these lugs 32 are bent back to the original positions in the plane of the wall 24, after which the protecting member may readily be detached from the journal bearing.

The novel protecting member herein disclosed has been found very practical in actual use. By its employment, journal bearings may be shipped, together with other rough commodities, without expensive crating or packaging. In other words, when the protecting member 7 is attached to a journal bearing, as shown in Figure 3, the bearing surface 4 thereof is completely concealed and is so protected that the bearing may be roughly handled while in transit, without any possible danger of the bearing surface thereof becoming scratched or marred. As a result, the bearings may be shipped at relatively lower transportation rates. Also, by the employment of this novel protector, extra journal bearings may be conveniently carried in a railroad car or coach for immediate use, without danger of becoming marred or damaged and, in like manner, they may readily be stored in storehouses and other places, one upon the other, or in any suitable manner, without any danger of the bearing surfaces thereof becoming damaged, and with considerable economy in the amount of space required, as compared to present methods.

The bearing protector member is preferably made from comparatively light gauge sheet metal, having sufficient stiffness and rigidity to retain its proper shape, when attached to the journal bearing, and also whereby it may readily be returned to the sender without requiring any wrapping or packaging.

While I have herein described the novel protector as being designed primarily for use in connection with interchangeable journal bearings, such as commonly used in the journal boxes of railroad cars, coaches and other rolling stock, it is to be understood that the protector may be used in connection with other types of bearings where applicable without departing from the scope of the invention. It is also to be understood that I do not wish to be limited to the specific construction shown, as obviously minor changes may be made in the constructional details thereof without departing from the scope of the invention.

While in the accompanying drawing and specification, I have shown and described the novel device as being primarily adapted for use to protect the finished surface of a journal bearing, it may also be utilized as a means for checking the overall dimensions of journal bearings as, for example, the length and width thereof, and the location of the lugs 6 on the sides thereof. In other words, the protectors are made in different sizes corresponding to the standard sizes of journal bearings in common use, and the overall dimensions thereof may be made to correspond substantially to the overall dimensions of the specific bearings with which they are to be used, so that when fitted thereonto, it may readily be noted if the overall dimensions of the bearing are substantially correct. Thus, in addition to protecting the finished surfaces of the journal bearings, the protectors may also be used for checking or gauging the overall dimensions of the bearings.

The protector may be made from any suitable material applicable for the purpose, but from actual experience, I have found sheet metal to be the most desirable, as it is capable of withstanding rough handling, and does not readily become distorted or damaged when in transit.

I claim as my invention:

1. The combination with a journal brass having an exposed bearing surface, of a member fitting over the bearing surface thereof and concealing and protecting the same, said member having portions embracing the sides of the brass to secure the member thereto.

2. The combination with a journal brass having an exposed bearing surface, of a protecting member fitting over the bearing surface thereof and concealing the same, and means for detachably securing the member to the body of the journal brass.

3. The combination with a journal brass having an exposed bearing surface, of a protecting member for the bearing surface thereof comprising a metallic body adapted to be fitted over the bearing surface to conceal the same and protect it from damage, and means for frictionally securing the member to the body of the brass.

4. The combination with a journal brass having an exposed bearing surface and oppositely disposed projections, of a protecting member for the bearing surface thereof comprising a metallic body adapted to be fitted over the bearing surface to conceal the same and protect it from damage, said protecting member having its opposite sides shaped to embrace the projections on the body of the brass, thereby to retain the member in position thereon.

5. A protecting member for a journal brass, comprising a body portion of sheet metal curved to substantially fit the contour of the bearing surface, said member having oppositely disposed horizontal portions shaped to engage the usual projections on the sides of the brass to thereby retain the member in position thereon.

6. A protecting member for a journal brass, comprising a body portion having its marginal edge portions angularly bent with respect to the body portion thereof and adapted to embrace the usual projections on the journal brass to retain the member in position thereon, and means for detachably securing the member to the brass.

7. A protecting member for a journal brass comprising a sheet metal body portion curved to substantially fit the contour of the bearing surface, the opposite edge portions of said body being shaped to embrace the usual projections on the sides of the brass, thereby to retain the member in position thereon, and spring means for detachably securing the member to the bearing.

8. A protecting member for a journal brass having an exposed bearing surface, said member comprising a wall adapted to conceal the bearing surface of the bearing and having marginal portions shaped to embrace the usual projections on the brass, thereby to frictionally retain the member in position thereon.

9. A protecting member for a journal brass having an exposed bearing surface, said member comprising a main wall and end walls cooperating to conceal the bearing surface of the brass, and means on said member for detachably securing it to the body of the journal brass.

JOHN E. McMAHON.